(12) United States Patent
Broker et al.

(10) Patent No.: US 10,508,831 B2
(45) Date of Patent: *Dec. 17, 2019

(54) PERFORMING INTEGRITY CHECKS ON CLIMATE CONTROL SYSTEM COMPONENTS

(71) Applicant: Emerson Electric Co., St. Louis, MO (US)

(72) Inventors: John F. Broker, Warrenton, MO (US); John J. Heller, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 473 days.

This patent is subject to a terminal disclaimer.

(21) Appl. No.: 15/375,837

(22) Filed: Dec. 12, 2016

(65) Prior Publication Data

US 2017/0115033 A1 Apr. 27, 2017

Related U.S. Application Data

(63) Continuation-in-part of application No. 13/687,346, filed on Nov. 28, 2012, now Pat. No. 9,518,763.

(60) Provisional application No. 61/724,642, filed on Nov. 9, 2012.

(51) Int. Cl.
*F24H 9/20* (2006.01)
*F24F 11/32* (2018.01)

(52) U.S. Cl.
CPC ......... *F24H 9/2064* (2013.01); *F24H 9/2085* (2013.01); *F24F 11/32* (2018.01); *G05B 2219/24001* (2013.01); *G05B 2219/2614* (2013.01)

(58) Field of Classification Search
CPC ................. F24H 9/2064; F24H 9/2085; G05B 2219/2614; G05B 2219/24001
See application file for complete search history.

(56) References Cited

U.S. PATENT DOCUMENTS

| | | |
|---|---|---|
| 4,402,663 A | 9/1983 | Romanelli et al. |
| 4,842,510 A | 6/1989 | Grunden et al. |
| 4,872,828 A | 10/1989 | Mierzwinski et al. |
| 5,076,780 A | 12/1991 | Erdman |

(Continued)

OTHER PUBLICATIONS

ClimateTalk® Alliance; www.climatetalkalliance.org;accessed; accessed Nov. 28, 2012; 1 pg.

(Continued)

*Primary Examiner* — Dominic E Hawkins
(74) *Attorney, Agent, or Firm* — Harness, Dickey & Pierce, P.L.C.; Anthony G. Fussner

(57) ABSTRACT

Exemplary embodiments are disclosed of a climate control system that includes an igniter and a controller having an igniter relay. The controller senses a current level through the igniter and senses voltage between terminals of a second relay of the controller. In a given one of a plurality of operational phases of the system, the controller is configured to compare the sensed current level and sensed voltage to a current level and voltage associated with a specific condition of the igniter, igniter relay, or second relay in the given phase. Based on a result of the comparing, the controller is configured to distinguish between a failure of one of the relays and a failure of the igniter.

20 Claims, 15 Drawing Sheets

(56) References Cited

U.S. PATENT DOCUMENTS

| | | | | |
|---|---|---|---|---|
| 6,059,195 | A * | 5/2000 | Adams | F23N 5/203 |
| | | | | 236/20 R |
| 6,109,531 | A * | 8/2000 | Hollis | F24D 19/1084 |
| | | | | 165/205 |
| 6,535,838 | B2 | 3/2003 | Abraham et al. | |
| 7,123,020 | B2 | 10/2006 | Hill et al. | |
| 7,296,426 | B2 | 11/2007 | Butler et al. | |
| 7,748,225 | B2 | 7/2010 | Butler et al. | |
| 7,774,102 | B2 | 8/2010 | Butler et al. | |
| 7,784,291 | B2 | 8/2010 | Butler et al. | |
| 9,518,763 | B2 * | 12/2016 | Broker | F24H 9/2064 |
| 2006/0111795 | A1 * | 5/2006 | Butler | G05B 23/027 |
| | | | | 700/19 |
| 2007/0012052 | A1 * | 1/2007 | Butler | F25B 49/02 |
| | | | | 62/181 |
| 2008/0073440 | A1 | 3/2008 | Butler et al. | |
| 2010/0236538 | A1 * | 9/2010 | Wah | F23N 5/105 |
| | | | | 126/39 BA |
| 2011/0264269 | A1 * | 10/2011 | Chodacki | F24C 3/126 |
| | | | | 700/274 |
| 2017/0115033 | A1 * | 4/2017 | Broker | F24H 9/2085 |

OTHER PUBLICATIONS

Allen-Bradley, "Safety Relays: Catalog No. 700Z", 1998, Allen-Bradley pp. 1-40: http://literature.rockwellautomation.com/idc/groups/literature/documents/td/700-td556 -en-p.pdf.

Canadian Office Action dated Apr. 10, 2015, issued in co-pending Canadian Application No. 2,831,215 which has the same priority as the instant application.

* cited by examiner

PERFORMING INTEGRITY CHECKS ON CLIMATE CONTROL SYSTEM COMPONENTS

CROSS-REFERENCE TO RELATED APPLICATIONS

This application is a continuation-in-part of U.S. application Ser. No. 13/687,346, filed on Nov. 28, 2012, which claims the benefit of U.S. Provisional Application No. 61/724,642, filed on Nov. 9, 2012. The entire disclosures of the above applications are incorporated herein by reference.

FIELD

The present disclosure relates to performing integrity checks on components of climate control systems, including heating, ventilation, and air conditioning (HVAC) systems and furnaces.

BACKGROUND

This section provides background information related to the present disclosure which is not necessarily prior art.

Currently available HVAC systems provide a wide range of climate control capabilities, and thus can be more complex, than previously manufactured systems. As HVAC systems continue to evolve, their complexity can be expected to increase.

SUMMARY

This section provides a general summary of the disclosure, and is not a comprehensive disclosure of its full scope or all of its features.

Exemplary embodiments are disclosed of a method performed by a controller of a climate control system. In one or more of a plurality of operational phases of the system, the controller senses current draw by a first component of the system and senses voltage between terminals of a second component of the system. For a given one of the operational phases in which the sensing is performed, the controller compares the sensed current and voltage with a current value and voltage value predetermined in relation to the given operational phase to indicate the presence of a condition specifically of the first, of the second, or of a third component of the system. Based on the comparing, the controller signals an identification of the specific condition.

Exemplary embodiments also are disclosed of a furnace system that includes an igniter and a controller having an igniter relay. The controller is configured to sense a current level through the igniter and to sense voltage between terminals of a second relay of the controller. In a given one of a plurality of operational phases of the system, the controller is configured to compare the sensed current level and sensed voltage to a current level and voltage associated with a specific condition of the igniter, igniter relay, or second relay in the given phase. Based on a result of the comparing, the controller is configured to distinguish between a failure of one of the relays and a failure of the igniter.

Exemplary embodiments also are disclosed of a controller for an HVAC or furnace system having a gas igniter and a humidifier. The controller includes an igniter relay for controlling the igniter. The controller senses a current level through the igniter and senses voltage between terminals of a humidifier relay for controlling the humidifier. Based on the sensing performed after a call for heat and prior to a pre-purge of the system, the controller determines whether the humidifier relay is shorted. Based on the sensing performed after pre-purge begins and before igniter warm-up, the controller determines whether the humidifier relay is open and determines whether the igniter relay is shorted. Based on the sensing performed when the igniter is warming up and before a gas valve of the system is energized, the controller determines whether the igniter is operating normally, determines whether the igniter is open, and determines whether the igniter relay is open.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

The inventors hereof have observed that where climate control and furnace systems are provided with capabilities for automatically detecting and identifying component failures, owners and servicers of the systems can benefit. For example, when an HVAC gas ignition system fails to operate properly, the owner might save money, and a service person might save time, if it were easy to determine, e.g., whether the system has a faulty igniter or a faulty igniter relay. Currently available HVAC systems often provide no error detection or may provide a means to detect the voltage output of the igniter. The inventors have observed that such detection means typically are inadequate to easily identify which part of an ignition system has actually failed.

The inventors also have observed that when a first furnace component draws current at a particular level at the same time that a particular level of voltage is present between terminals of a second furnace component, the coincidence or occurrence of a particular voltage and current level can be used to identify a specific fault of a specific furnace component. The inventors have determined that by looking at both a voltage and a current, e.g., when an ignition process is being performed as a sequence of operational phases in an HVAC system, one can use the occurrence of a predetermined current level together with a predetermined voltage level in a predetermined operational phase of the furnace to determine, e.g., whether an igniter is faulty or whether a relay controlling the igniter is faulty.

Accordingly, exemplary embodiments are disclosed of a method performed by a controller of a climate control system. In one or more of a plurality of heating operational phases of the system, the controller senses current draw by a first component of the system and senses voltage between terminals of a second component of the system. For a given one of the heating operational phases in which the sensing is performed, the controller compares the sensed current and voltage with a current value and voltage value predetermined in relation to the given operational phase to indicate the presence of a condition specifically of the first, of the second, or of a third component of the system. Based on the comparing, the controller signals an identification of the specific condition. It should be noted that a "particular" or "predetermined" voltage level and/or a "particular" or "predetermined" current level can include appropriate ranges of voltage and/or current and/or can include zero voltage and/or zero current. It should also be noted that aspects of the disclosure could be practiced in relation to other or additional climate control system operational phases, including but not limited to other or additional heating phases, ventilation phases, and/or cooling phases.

Figure 1:
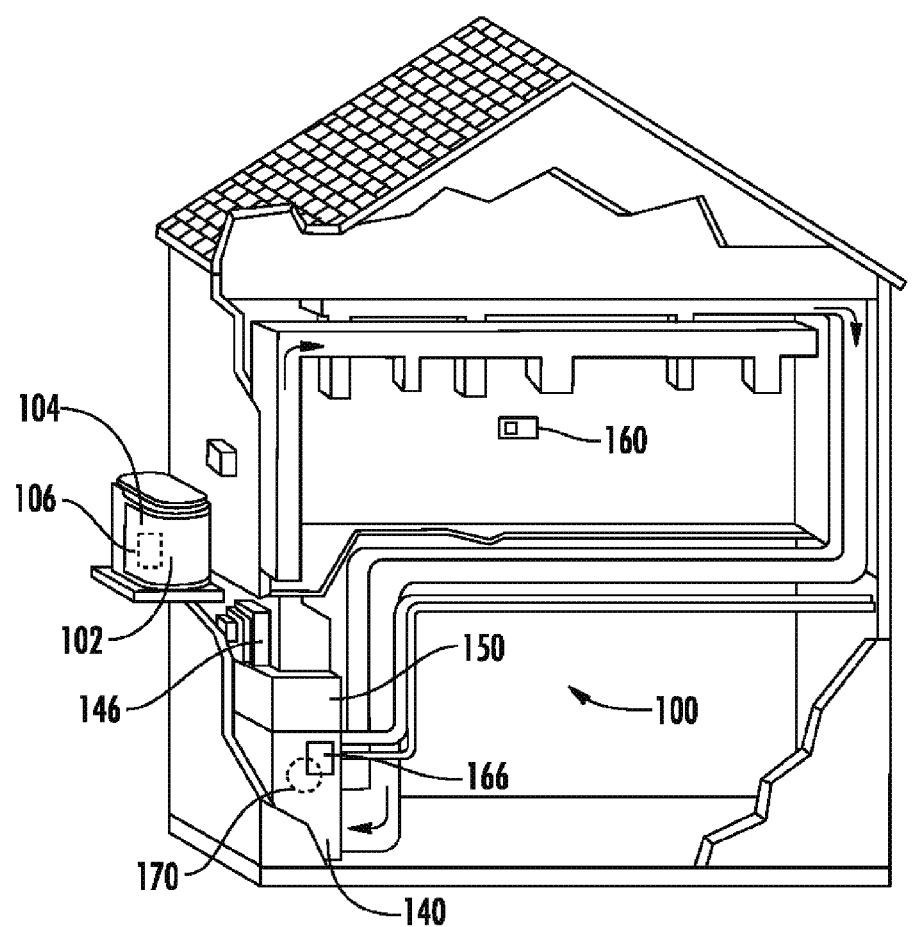
FIG. 1 is an illustration of a climate control system configured in accordance with one aspect of the disclosure.

One example of a climate control system configured in accordance with one aspect of the disclosure is indicated generally in FIG. 1 by reference number 100. In the present example, the climate control system 100 is an HVAC system. An air conditioner 102 includes a condenser unit 104 having a compressor 106. The system 100 also includes a gas-fired furnace 140, a humidifier 146, and a blower unit 150 having a blower motor (not shown) that in some embodiments may be operated in a fan mode separate from heating or cooling operation. Climate control system embodiments also are possible that include, e.g., a heat pump and an auxiliary heating system having a gas-fired furnace, etc.

A thermostat 160 is capable of sensing temperature and responsively initiating operation of the air conditioner 102 or furnace 140 when the sensed temperature is more than a predetermined amount above or below a set point temperature of the thermostat 160. When the thermostat 160 signals a request for heating, a furnace controller 166 controls the activation of the furnace 140, which includes activation of an inducer 170, the humidifier 146, and an igniter (not shown in FIG. 1) to provide for heating operation. In various aspects of the present disclosure, the furnace controller 166 may be configured to sense current and voltage in the system 100 for the performance of integrity testing as further described below.

Figure 2:
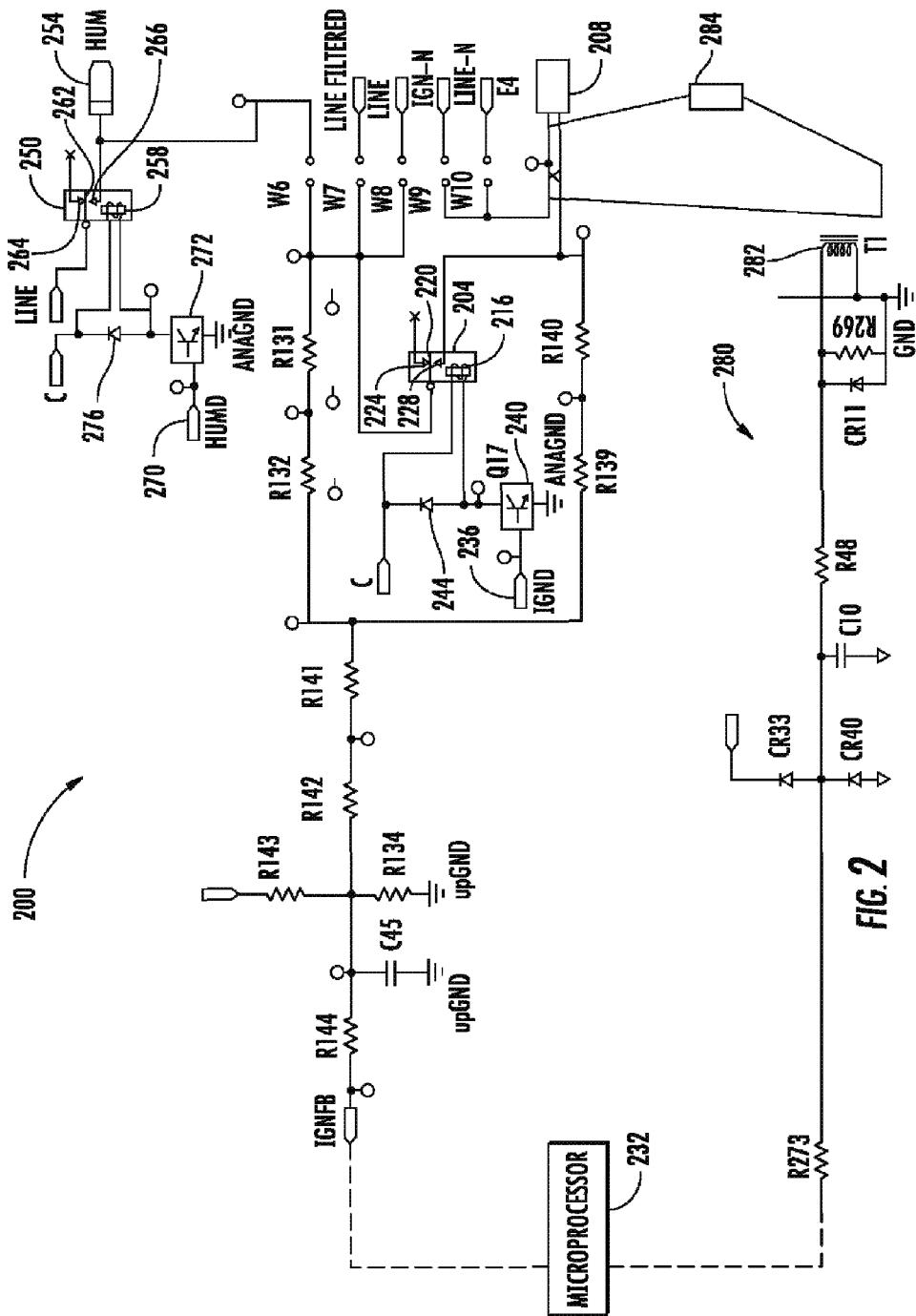
FIG. 2 is a circuit diagram of a climate control system controller configured in accordance with one aspect of the disclosure.

In one aspect of the disclosure, a climate control system controller may be provided, e.g., as an integrated furnace control, as indicated generally in FIG. 2 by reference number 200. The controller 200 includes an igniter relay 204 configured to actuate an igniter 208 for igniting a furnace gas valve (not shown). In an exemplary embodiment, the igniter relay 204 is a single-pole-double-throw (SPDT) relay. Accordingly the igniter relay 204 includes a solenoid 216 operable to move an armature contact 220 from a "normally closed" terminal 224 to an "open" relay terminal 228 to switch the igniter 208 on, and to move the contact 220 back to the relay terminal 224 to switch the igniter 208 off. A microprocessor 232 generates control signals at a terminal 236, which are amplified by a transistor 240 and sent to the solenoid 216. A diode 244 is provided in parallel with the solenoid 216 to quench voltage surge when the solenoid 216 is actuated. When the igniter 208 is switched on and operating normally, current flows through the relay contact 220 and across the igniter 208. Although the igniter relay 204 is a SPDT relay in this exemplary embodiment, other embodiments are possible in which other or additional types of relays (e.g., single-pole-single-throw (SPST) relays, etc.) are used.

The controller 200 also includes a humidifier relay 250 configured to actuate a humidifier (not shown in FIG. 2) through a HUM terminal 254. In an exemplary embodiment, the humidifier relay 250 is a single-pole-double-throw (SPDT) relay. Accordingly, the relay 250 includes a solenoid 258 operable to "pull" an armature contact 262 from a normally closed (NC) terminal 264 to an "open" relay terminal 266 to enable the humidifier, and to allow the contact 262 to return to the NC relay terminal 264 to disable the humidifier. The microprocessor 232 generates control signals at a terminal 270, which are amplified by a transistor 272 and sent to the solenoid 258. A diode 276 is provided in parallel with the solenoid 258 to quench voltage surge when the solenoid 258 is actuated. Although the humidifier relay 250 is a SPDT relay in this exemplary embodiment, other embodiments are possible in which other or additional types of relays (e.g., single-pole-single-throw (SPST) relays, etc.) are used.

Various voltage levels may be exhibited as the contact 262 is moved between the humidifier relay terminals 264 and 266. During operation, the system provides a "pull-in" voltage across the solenoid/relay to cause the contact 262 to move from the NC terminal 264 to the "open" terminal 266. When the contact 262 has been pulled into contact with the "open" terminal 266, the coil is saturated and needs less voltage (a "hold" voltage) to maintain the contact 262 "pulled in" at the "open" terminal 266. The "hold" voltage is typically less than the "pull in" voltage. When the humidifier relay 250 is operating normally and the microprocessor 232 switches off current through the solenoid 258, the contact 262 returns into contact with the NC terminal 264.

A current sensing circuit 280 is connected across the igniter 208 through a toroidal current transformer 282 and includes an appropriately sized resistor or calibrated printed control board (PCB) trace 284. A current level through the igniter 208 is sensed at the current transformer 282 and signaled to the microprocessor 232, which uses the sensed current level as further described below. In the example embodiment shown in FIG. 2, sensing of current through the igniter 208 is performed by the current sensing circuit 280 independently of the igniter relay 204. Additionally, in various aspects of the disclosure, voltage between the humidifier relay terminals 264 and 266 is sensed and signaled to the microprocessor 232.

During normal operation, the controller 200 performs an ignition sequence that is prompted by a thermostat call for heat. In various aspects of the disclosure, the controller 200 is configured to determine igniter 208, igniter relay 204, and/or humidifier relay 250 faults by applying conditional tests for each of the foregoing components as the ignition sequence progresses. The ignition sequence is performed in a plurality of operational phases. A preliminary phase 0 takes place after the call for heat and before a pre-purge process begins. Neither the igniter 208 nor the humidifier is switched on during phase 0. In phase 1, pre-purge is performed. A furnace inducer (not shown in FIG. 2) is switched on, and the humidifier relay 250 is enabled. Phase 2 takes place before a furnace gas valve (not shown) is energized. In phase 2, the igniter 208 is switched on and warms up, the inducer remains on, and the humidifier relay 250 remains enabled.

In a given one of one or more of the foregoing phases, the controller 200 senses the current level through the igniter 208 and the voltage across the humidifier relay terminals 264 and 266. The microprocessor 232 compares the sensed current level and voltage to a current level and voltage associated with a condition specifically of the igniter, humidifier relay, or a relay of the igniter in the given phase. Based on a result of the comparing, the controller 200 may signal an identification of the specific condition, e.g., on a furnace control board display (not shown), etc.

As shown in Table 1, the coincidence or occurrence of a particular current level through the igniter 208 with a particular voltage sensed across the humidifier relay terminals 264 and 266 in a particular phase of the ignition sequence can indicate the presence, e.g., of a specific fault in the igniter 208, igniter relay 204, or humidifier relay 250. Coincident values indicative of specific component conditions are indicated in bold type in Table 1.

sensed across the humidifier relay terminals 264 and 266 is compared to 60 VAC. If the sensed voltage is 60 VAC, then it is determined in process 312 that the humidifier relay 250 is shorted. This is shown above in Table 1 as the humidifier relay is shorted in phase 0 if the voltage is 60 VAC and the current is 0 Amps.

If it is determined in process 316 that phase 1 is the current phase, then in process 320 the voltage sensed across the humidifier relay terminals 264 and 266 is compared to 120 VAC. If the sensed voltage is 120 VAC and it also is determined that current, e.g., of about 10 Amps flows through the igniter 208, then in process 324 it is determined that the igniter relay 204 is shorted. Otherwise, it is determined in process 326 whether a voltage is present across the humidifier relay terminals 264 and 266, and also whether any current flows through the igniter 208. If it is determined that there is no voltage present across the humidifier relay terminals 264 and 266 and that there is no current flow through the igniter 208, then it is determined in process 330 that the humidifier relay 250 is open in phase 1. This is shown above in Table 1 as the humidifier relay is open in phase 1 if the voltage is 0 VAC and the current is 0 Amps.

TABLE 1

| Voltage sense<br>Current sense | Phase 0<br>Humidifier relay off<br>Igniter off | Phase 1<br>Humidifier relay on<br>Igniter off | Phase 2<br>Humidifier relay on<br>Igniter on |
| --- | --- | --- | --- |
| Good Igniter | Voltage = 0 VAC<br>Current = 0 Amps | Voltage = 60 VAC<br>Current = 0 Amps | Voltage = 120 VAC<br>Current = 10 Amps |
| Open Igniter | Voltage = 0 VAC<br>Current = 0 Amps | Voltage = 120 VAC<br>Current = 0 Amps | Voltage = 120 VAC<br>Current = 0 Amps |
| Open Igniter Relay | Voltage = 0 VAC<br>Current = 0 Amps | Voltage = 60 VAC<br>Current = 0 Amps | Voltage = 60 VAC<br>Current = 0 Amps |
| Shorted Igniter Relay | Voltage = 0 VAC<br>Current = 0 Amps | Voltage = 120 VAC<br>Current = 10 Amps | Voltage = 120 VAC<br>Current = 10 Amps |
| Shorted Humidifier Relay | Voltage = 60 VAC<br>Current = 0 Amps | Voltage = 60 VAC<br>Current = 0 Amps | Voltage = 120 VAC<br>Current = 10 Amps |
| Open Humidifier Relay | Voltage = 0 VAC<br>Current = 0 Amps | Voltage = 0 VAC<br>Current = 0 Amps | Voltage = 0 VAC<br>Current = 0 Amps |

As shown in the above table and with reference to FIG. 2, the humidifier relay voltage is at times 60V (e.g., in phase 1 with a good igniter 208) and at other times 120V (e.g., in phase 2 with a good igniter 208). With a good humidifier relay 250, a good igniter relay 204, and a good igniter 208, the line voltage (nominally 120VAC) input to the control comes to the humidifier relay 250. When the humidifier relay 250 turns on, this voltage is divided in half by the resistor network R131, R132, R139, and R140 using the path through the igniter 208 to neutral. Thus, the voltage to the sense circuit is 60 VAC. If the igniter 208 is open, then there is no current through R139 and R140, and thus the voltage is not divided by 2 and the voltage to the sense circuit is 120 VAC. If the igniter relay 204 is shorted, e.g., welded, then the voltage is also not divided and the sense circuit is 120 VAC.

In an example embodiment, the controller 200 may determine whether the igniter 208 is open, whether the igniter 208 is in normal operating condition, whether the igniter relay 204 is shorted or open, or whether the humidifier relay 250 is shorted or open. A test as to whether the humidifier relay 250 is shorted is performed in phase 0. Tests for open humidifier relay 250 and shorted igniter relay 204 are performed in phase 1. Tests for good igniter 208, bad igniter 208, and open igniter relay 204 are performed in phase 2.

Figure 3:
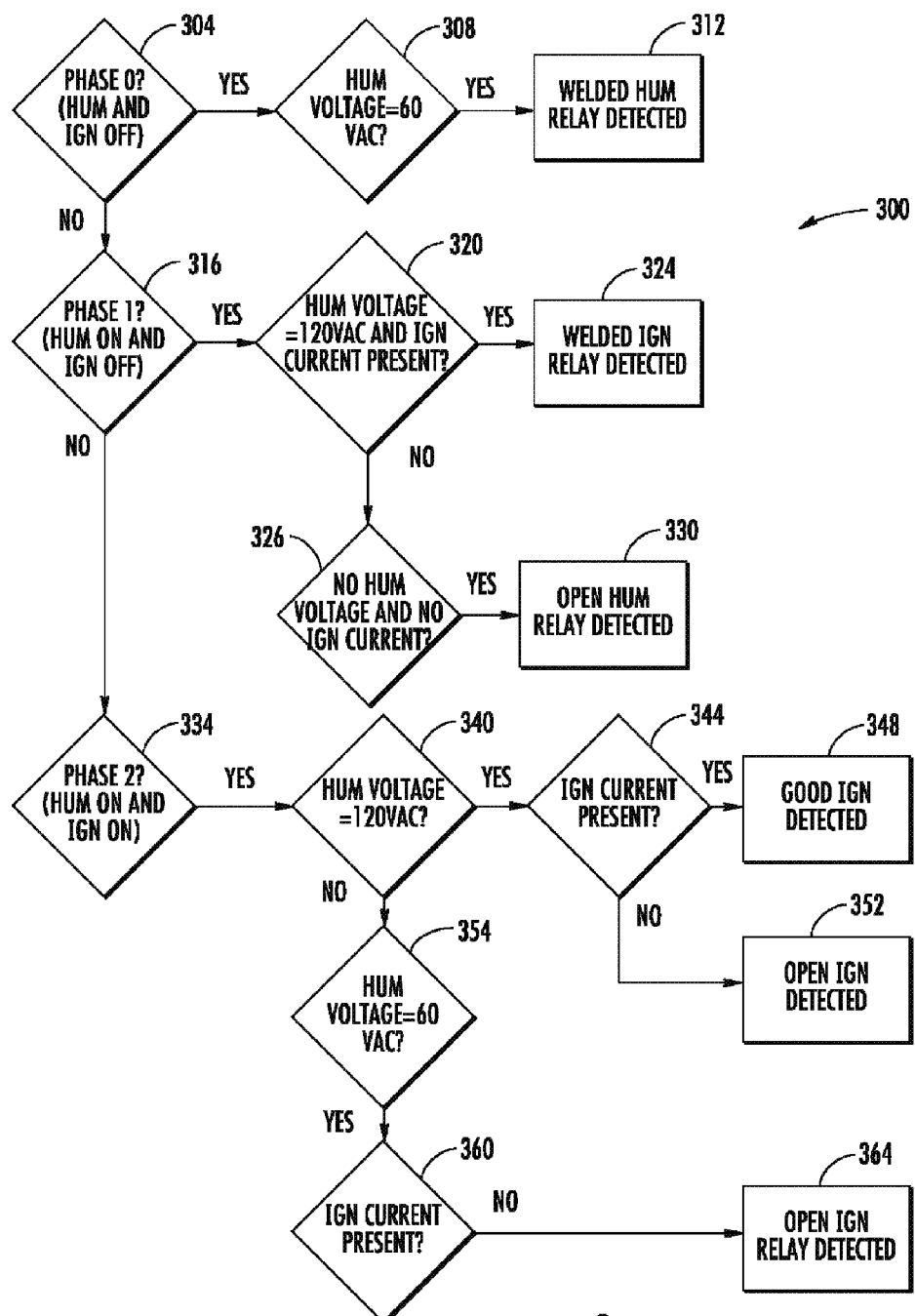
FIG. 3 is a flow diagram of a method of performing integrity checks on climate control components in accordance with one aspect of the disclosure.

One example method is indicated generally in FIG. 3 by reference number 300. If it is determined in process 304 that phase 0 is the current phase, then in process 308 the voltage If it is determined in process 334 that phase 2 is the current phase, then in process 340 the voltage sensed across the humidifier relay terminals 264 and 266 is compared to 120 VAC. If the sensed voltage is 120 VAC and it also is determined in process 344 that current, e.g., of about 10 Amps flows through the igniter 208, then it is determined in process 348 that the igniter 208 is operating normally. If no current is detected in process 344, then it is determined in process 352 that the igniter 208 is open. This is shown above in Table 1 as the igniter 208 is open in phase 2 if the voltage is 120 VAC and the current is 0 Amps.

If in process 354 it is determined that the voltage across the humidifier relay terminals 264 and 266 is 60 VAC, and it is also determined in process 360 that no current flows through the igniter 208, then in process 364 it is determined that the igniter relay 204 is open. This is shown above in Table 1 as the igniter relay 204 is open in phase 2 if the voltage is 60 VAC and the current is 0 Amps.

It should be understood generally that in various aspects of the disclosure, various climate control systems and/or system components could exhibit current levels and/or terminal voltage levels the same as and/or different from those discussed herein.

The foregoing methods and systems make it possible to make distinctions, e.g., among conditions shown in Table 1 in which no current flows through an igniter. Thus, in one aspect of the disclosure, a controller can distinguish a condition in which an igniter is open and an igniter relay is good, from a condition in which the igniter relay is open. The foregoing methods and systems also make it possible to make distinctions, e.g., among conditions in which a normal level of current appears through an igniter. Thus, in one aspect of the disclosure, a controller can distinguish a case in which an igniter is operating normally from a case in which an igniter relay is shorted. Thus, it can be determined whether a failure is one of an igniter or of a controller, e.g., a controller relay.

In an exemplary embodiment, a ClimateTalk® enabled control is operable to detect a failure of the igniter or a failure of the igniter relay by looking at if the level of the VAC sensed changes when the igniter relay goes from OFF to ON. If the VAC does not change (it stays at either 60 VAC or 120 VAC), then one of 3 conditions exist, either the igniter is open (stays at 120 VAC), the igniter relay is open (stays at 60 VAC), or the igniter relay is shorted (stays at 120 VAC). This exemplary method uses only voltage, and does not use current, since there is not a current sensing method in the exemplary embodiment.

A ClimateTalk® enabled control is a control that may send and/or receive signals or communicate using a ClimateTalk® protocol. For example, the ClimateTalk® enabled control may communicate with one or more devices in accordance with a four-wire communication protocol made available through the ClimateTalk® Alliance, www.climatetalkalliance.org. By way of further example, the ClimateTalk® enabled control may communicate with one or more devices in accordance with a protocol disclosed in U.S. Pat. No. 7,774,102, which is incorporated herein by reference.

Figure 4:
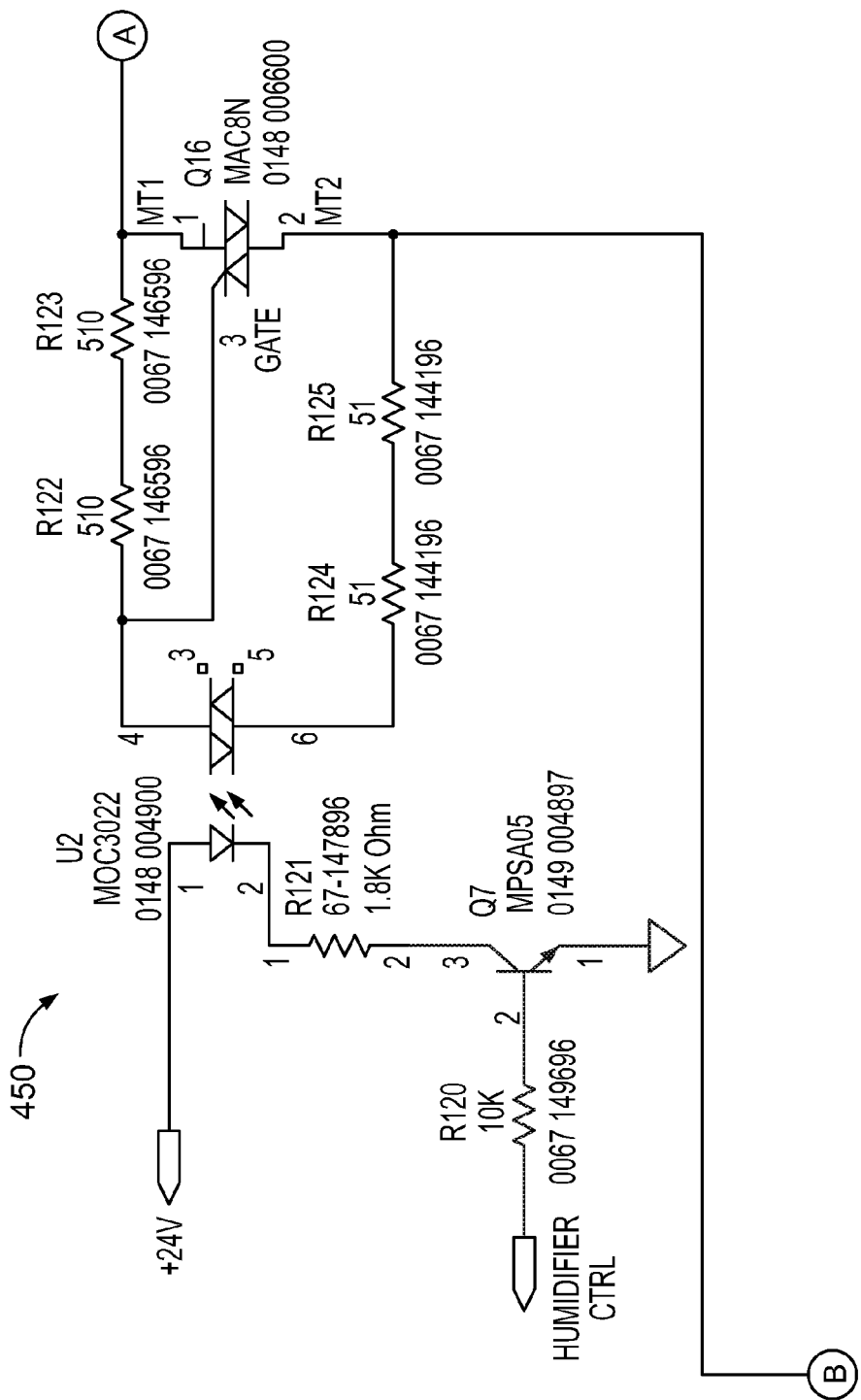
FIG. 4 is a circuit diagram of a climate control system controller configured in accordance with one aspect of the disclosure.
Figure 4:
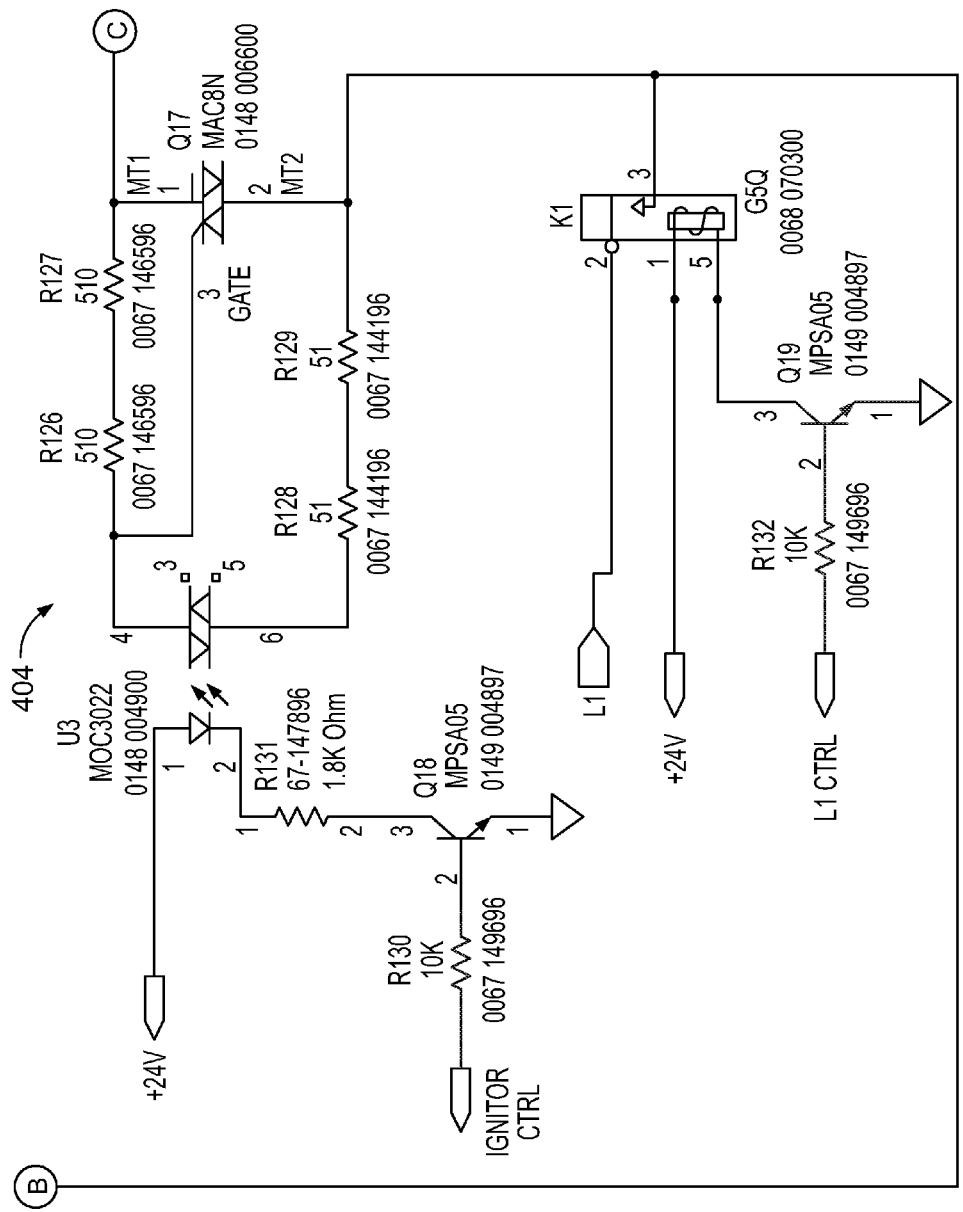
Figure 4:
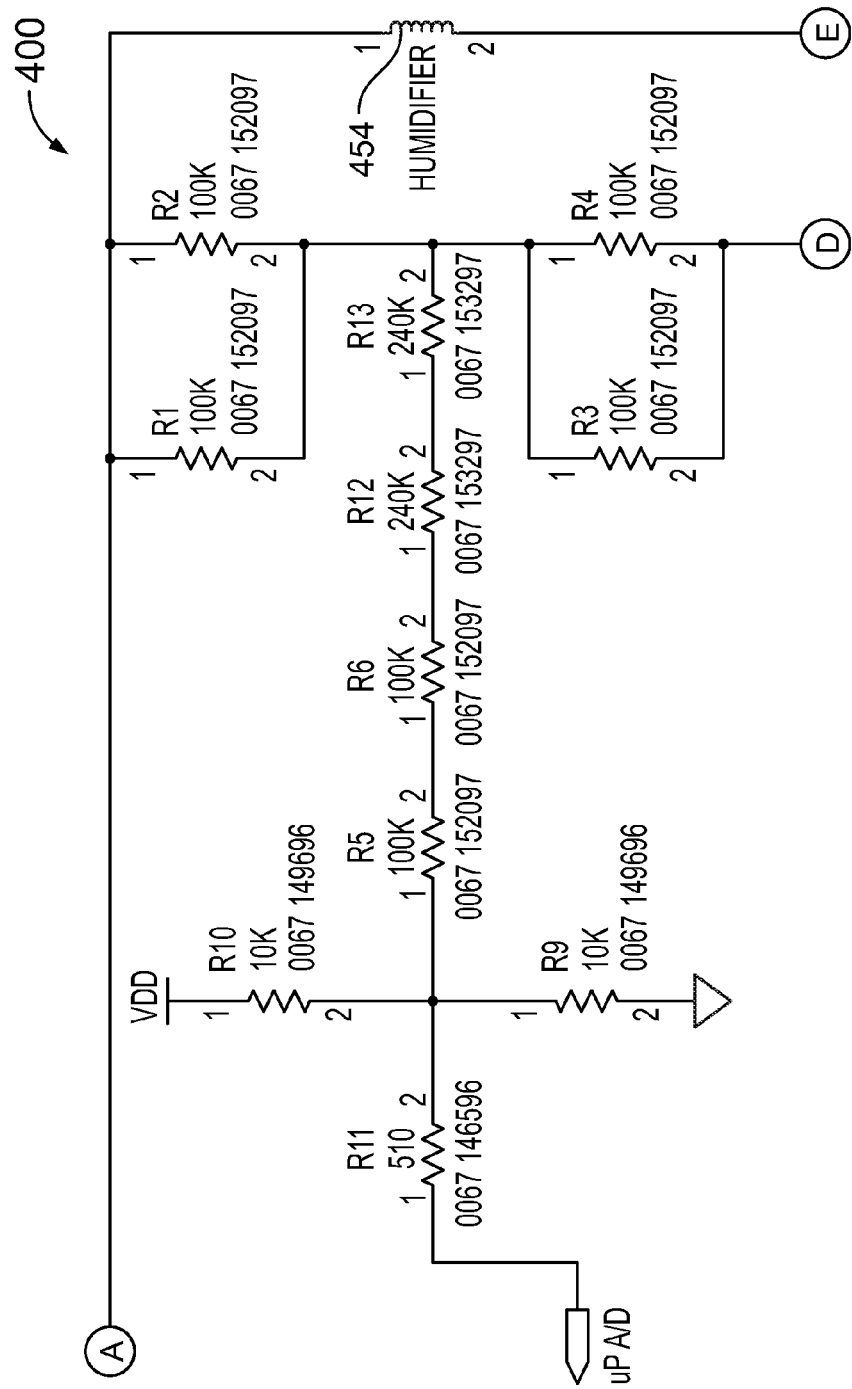
Figure 4:
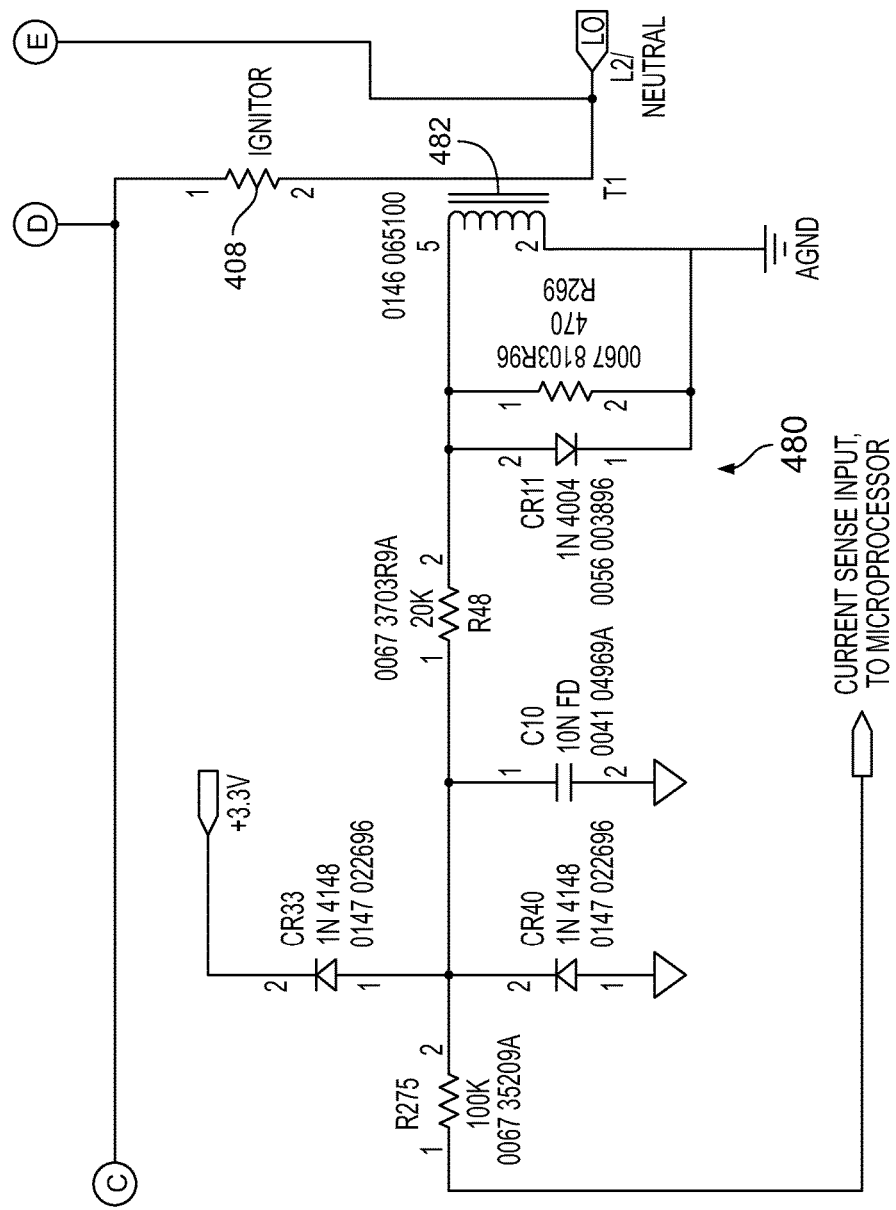

In another aspect of the disclosure, a climate control system controller may be provided, e.g., as an integrated furnace control, as indicated generally in FIG. 4 by reference number 400. The example controller 400 includes an igniter relay 404 configured to actuate an igniter 408 for igniting a furnace gas valve (not shown). The igniter relay 404 is a solid-state switching relay that includes an opto-coupler U3 with opto-triac driver, and a switching triac Q17. In operation, a microprocessor (not shown in FIG. 4) signals an NPN transistor Q18 to enable the opto-coupler U3 and opto-triac driver, which drives the triac Q17 to switch on the igniter 408. When the igniter 408 is switched on and operating normally, current flows through the triac Q17 and across the igniter 408.

The controller 400 also includes a humidifier relay 450 configured to actuate a humidifier 454. The humidifier relay 450 is a solid-state switching relay that includes an opto-coupler U2 with opto-triac driver, and a switching triac Q16. In operation, the microprocessor signals an NPN transistor Q7 to enable the opto-coupler U2 and opto-triac driver, which drives the triac Q16 to switch on the humidifier 454. When the humidifier 454 is switched on and operating normally, current flows through the triac Q16 and across the humidifier 454. In the present example embodiment, a relay K1 is provided to control operational voltage to triacs Q16 and Q17. If failure of a triac Q16 or Q17 is detected, the relay K1 can be opened to disconnect line voltage to the triacs.

A current sensing circuit 480 uses a toroidal current transformer 482 to sense current drawn by the igniter 408. A current level through the igniter 408 is sensed at the current transformer 482 and signaled to the microprocessor. In the example embodiment shown in FIG. 4, sensing of current drawn by the igniter 408 is performed by the current sensing circuit 480 independently of the igniter relay 404. Additionally or alternatively, in various aspects of the disclosure, voltage across terminals MT1 and MT2 of the humidifier relay triac Q16 may be sensed and signaled to the microprocessor.

During normal operation, the controller 400 performs an ignition sequence that is prompted by a thermostat call for heat. In various aspects of the disclosure, the controller 400 is configured to determine igniter 408, igniter relay 404, and/or humidifier relay 450 faults by applying conditional tests for each of the foregoing components as the ignition sequence progresses. The ignition sequence is performed in a plurality of operational phases. A preliminary phase 0 takes place after the call for heat and before a pre-purge process begins. Neither the igniter 408 nor the humidifier is switched on during phase 0. In phase 1, pre-purge is performed. A furnace inducer (not shown in FIG. 4) is switched on, and the humidifier relay 450 is enabled. Phase 2 takes place before a furnace gas valve (not shown) is energized. In phase 2, the igniter 408 is switched on and warms up, the inducer remains on, and the humidifier relay 450 remains enabled.

In a given one of one or more of the foregoing phases, the controller 400 senses the current level through the igniter 408 and the voltage across the humidifier relay terminals MT1 and MT2. The microprocessor compares the sensed current level and voltage to a current level and voltage associated with a condition specifically of the igniter, humidifier relay, or a relay of the igniter in the given phase. Based on a result of the comparing, the controller 400 may signal an identification of the specific condition, e.g., on a furnace control board display (not shown), etc.

As shown in Table 1, the coincidence or occurrence of a particular current level drawn by the igniter 408 with a particular voltage sensed across the humidifier relay terminals MT1 and MT2 in a particular phase of the ignition sequence can indicate the presence, e.g., of a specific fault in the igniter 408, igniter relay 404, or humidifier relay 450. Coincident values indicative of specific component conditions are indicated in bold type in Table 1.

Figure 5:
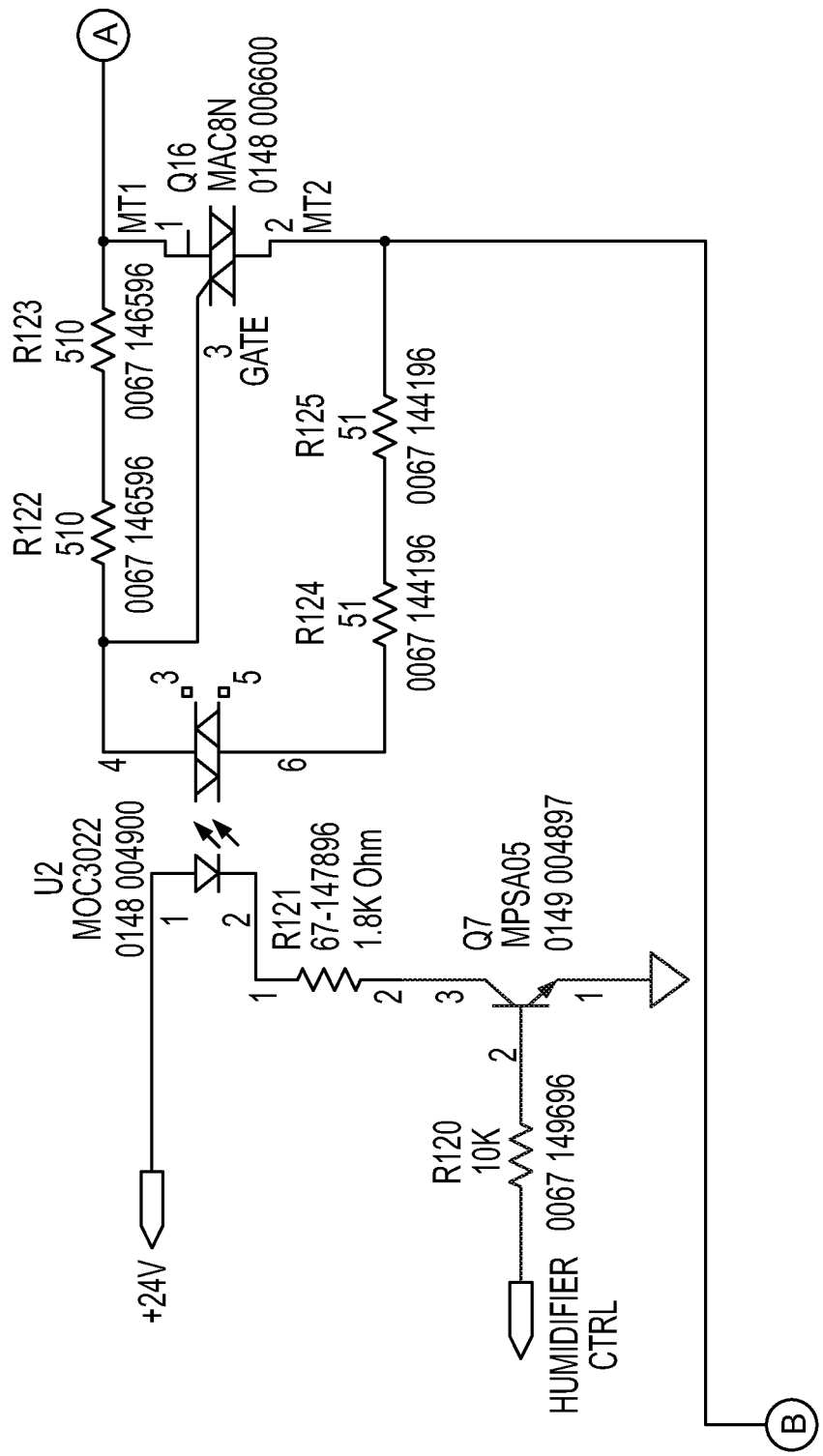
FIG. 5 is a circuit diagram of a climate control system controller configured in accordance with one aspect of the disclosure.
Figure 5:
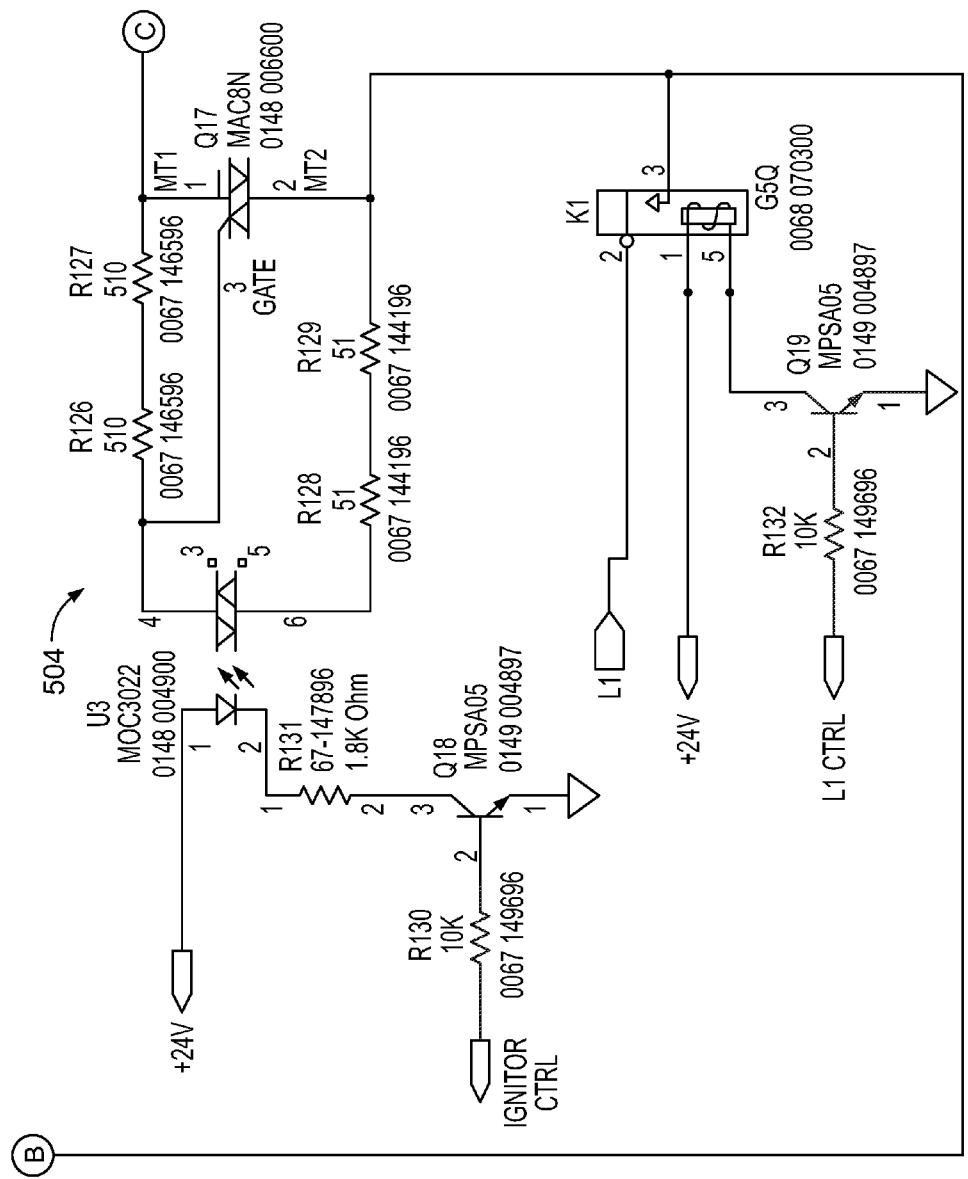
Figure 5:
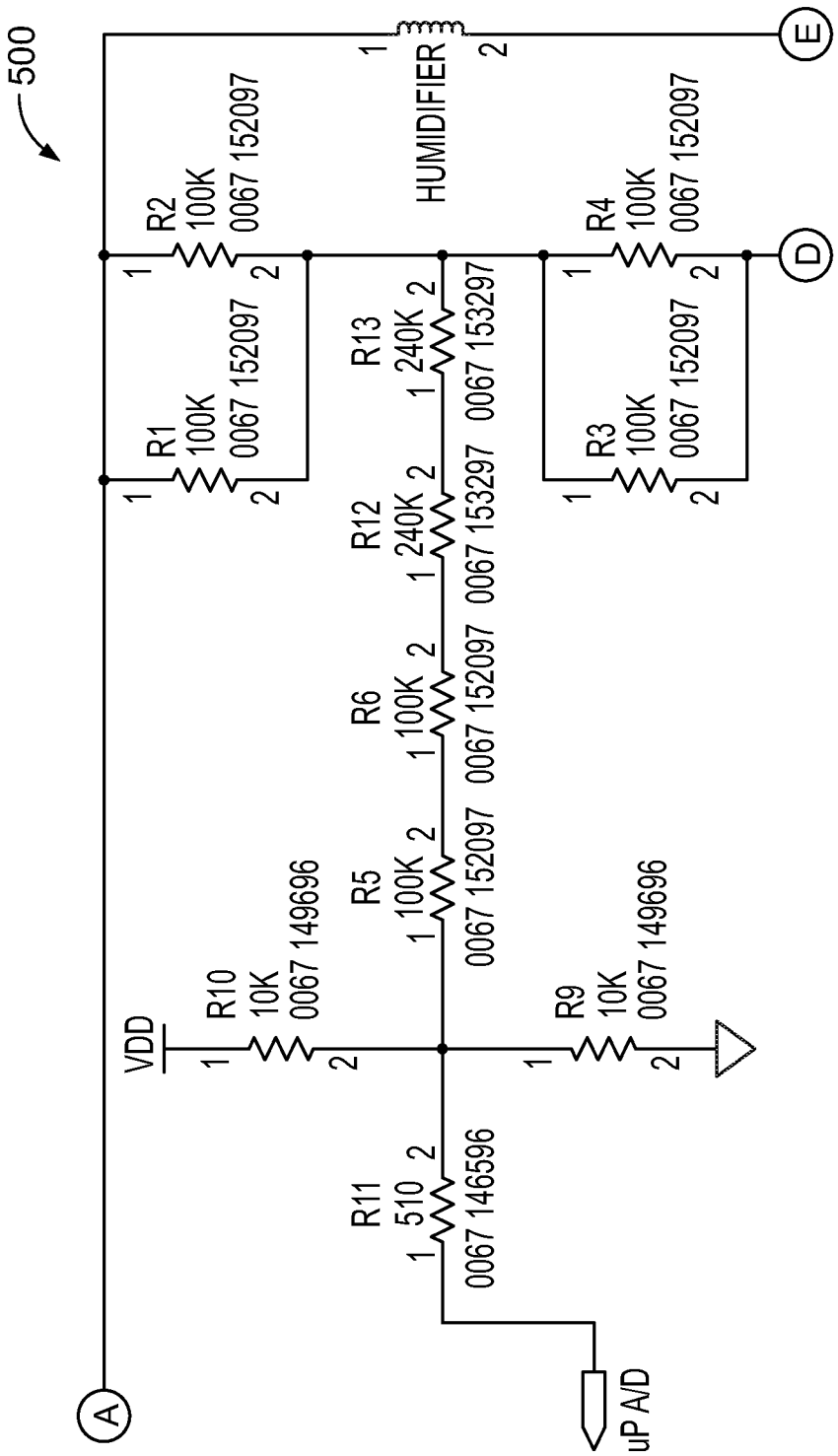
Figure 5:
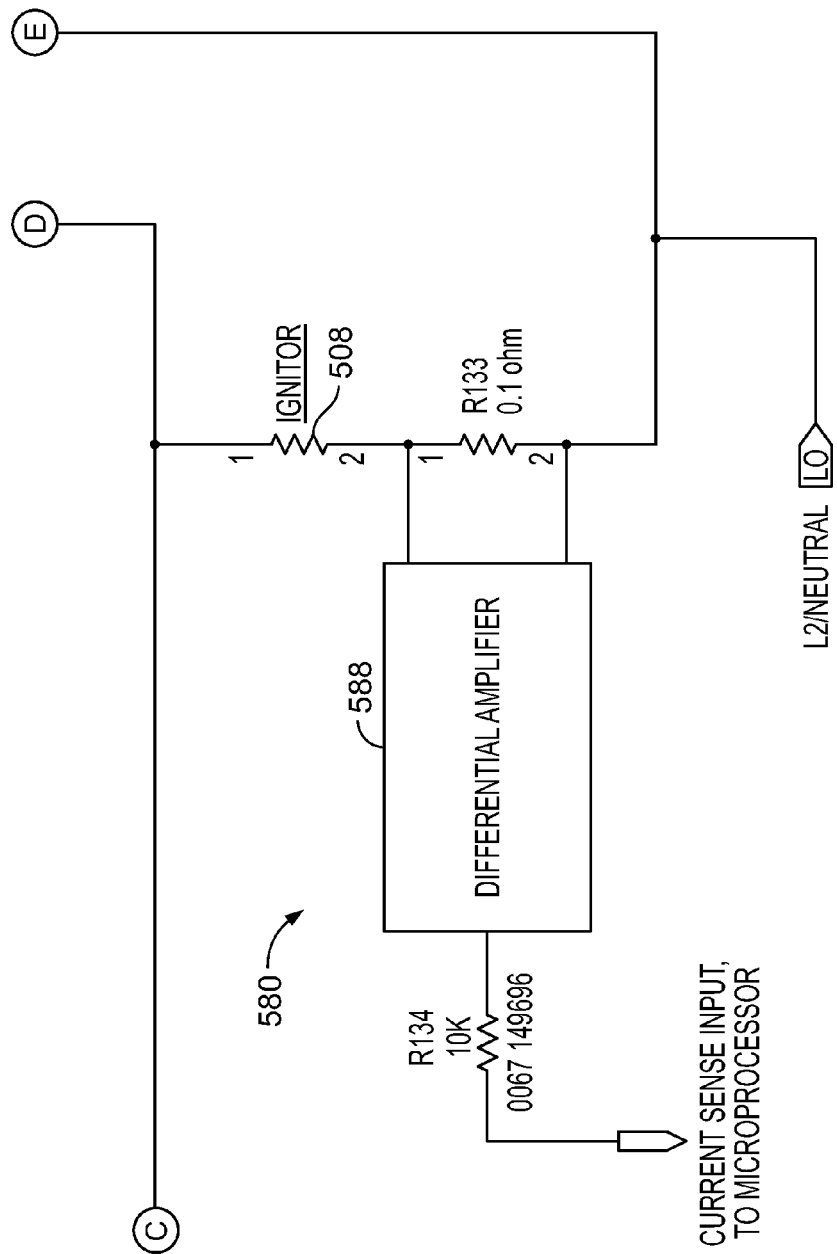

Various current- and voltage-sensing circuits may be used in various embodiments. In another example embodiment, a climate control system controller may be provided, e.g., as an integrated furnace control, as indicated generally in FIG. 5 by reference number 500. The example controller 500 includes an igniter relay 504, an igniter 508 and a current sensing circuit 580 that senses current drawn by the igniter 508. The current sensing circuit 580, which includes a sense resistor R133, differential amplifier 588 and resistor R134, provides current-sense input to a microprocessor (not shown.)

Figure 6:
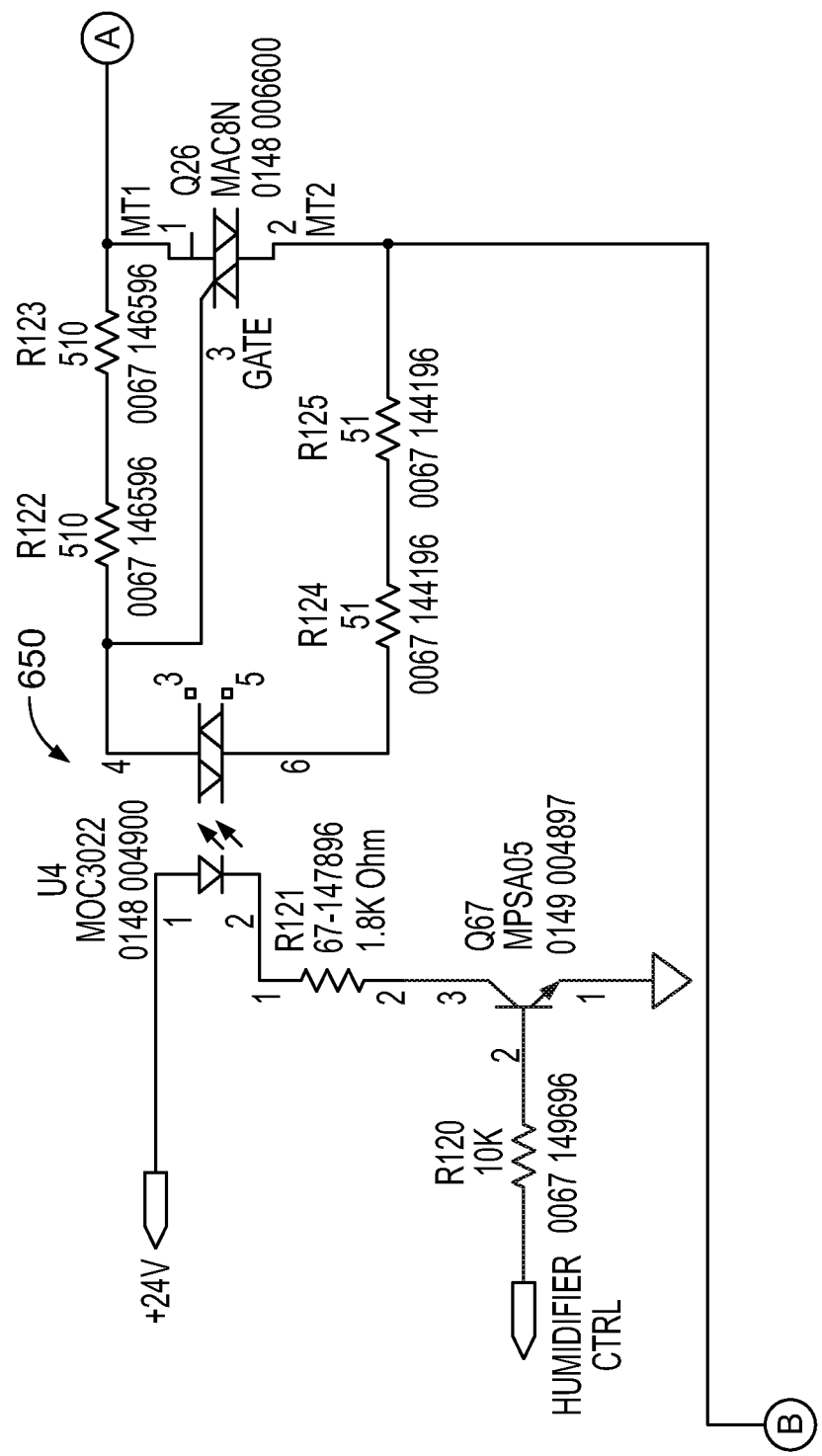
FIG. 6 is a circuit diagram of a climate control system controller configured in accordance with one aspect of the disclosure.
Figure 6:
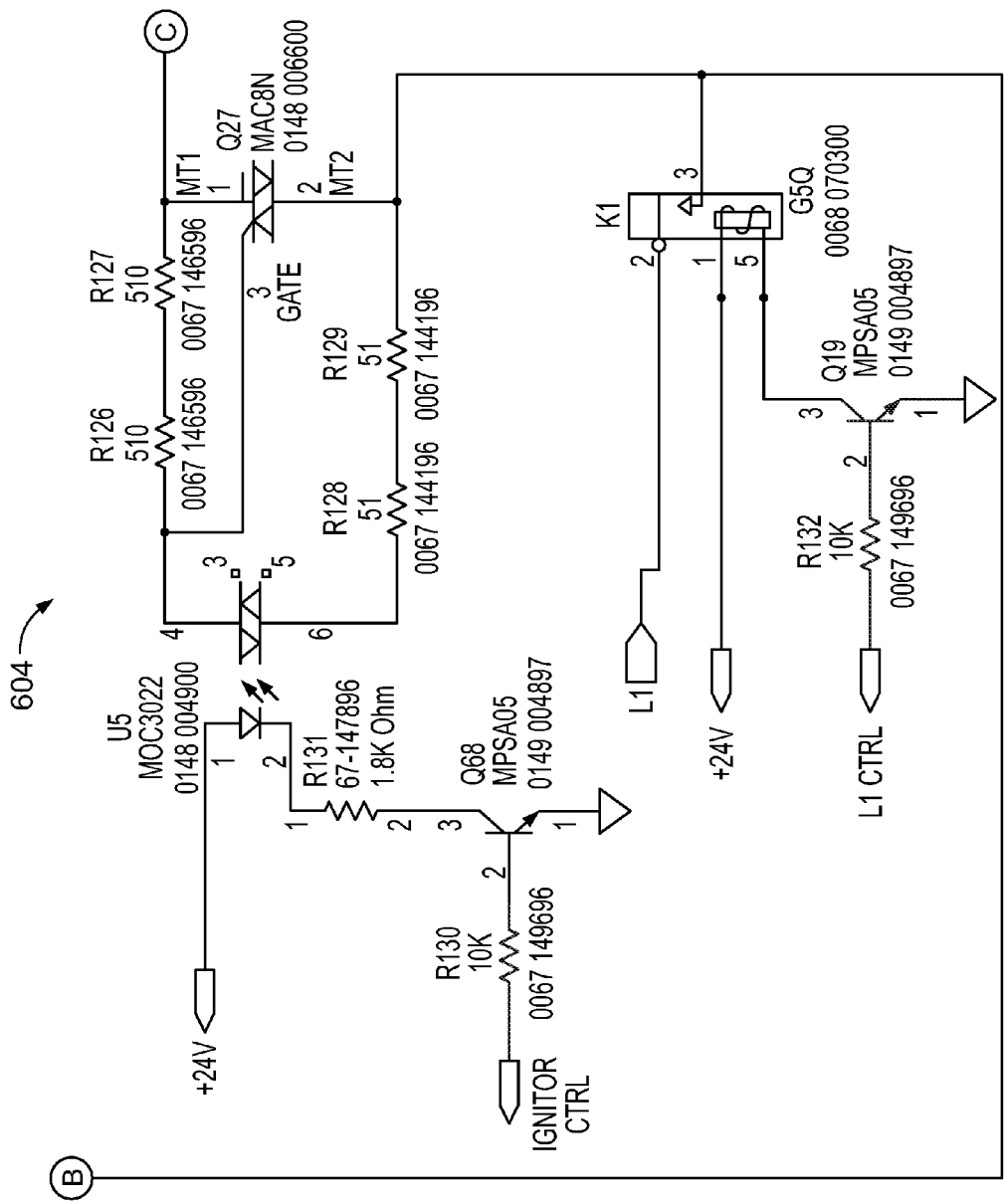
Figure 6:
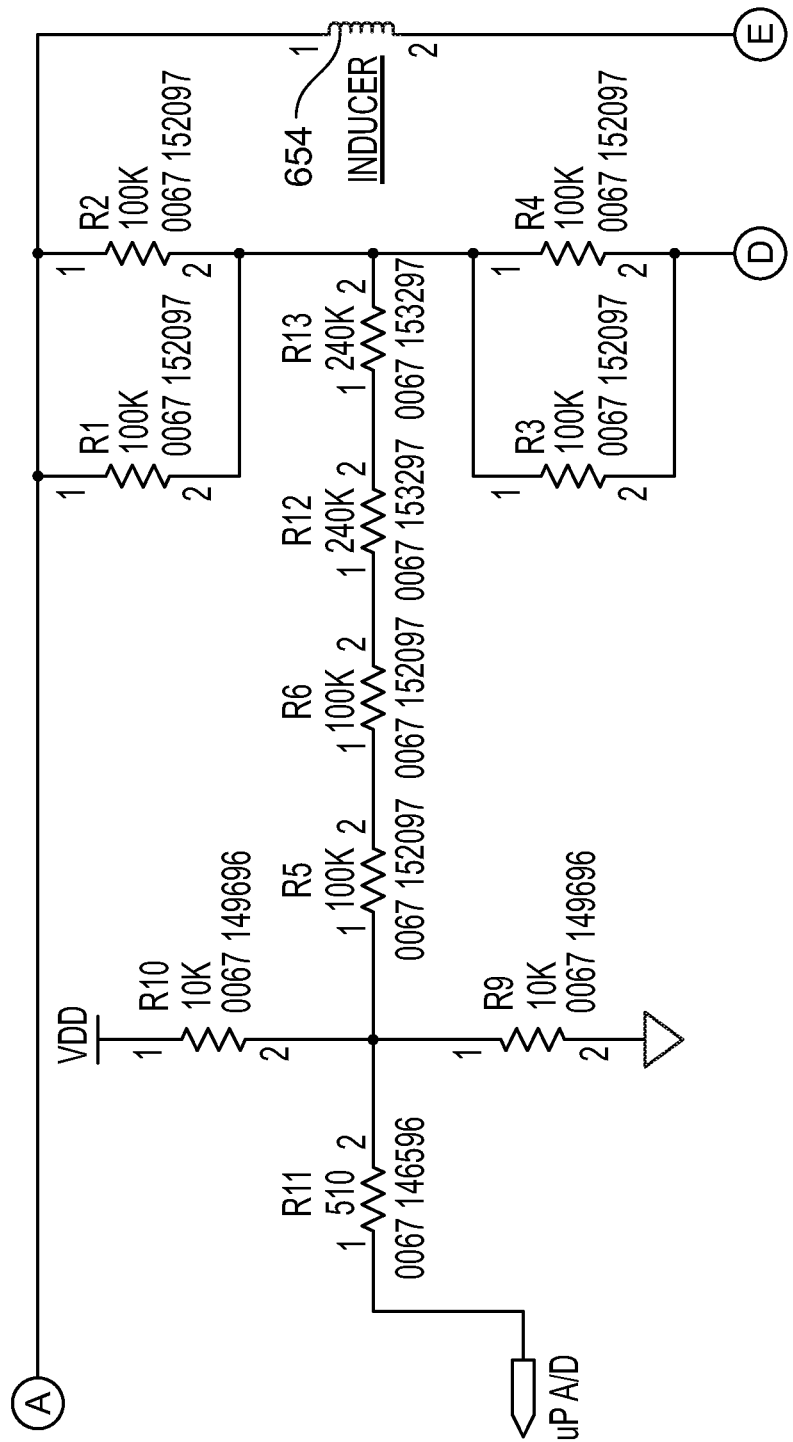
Figure 6:
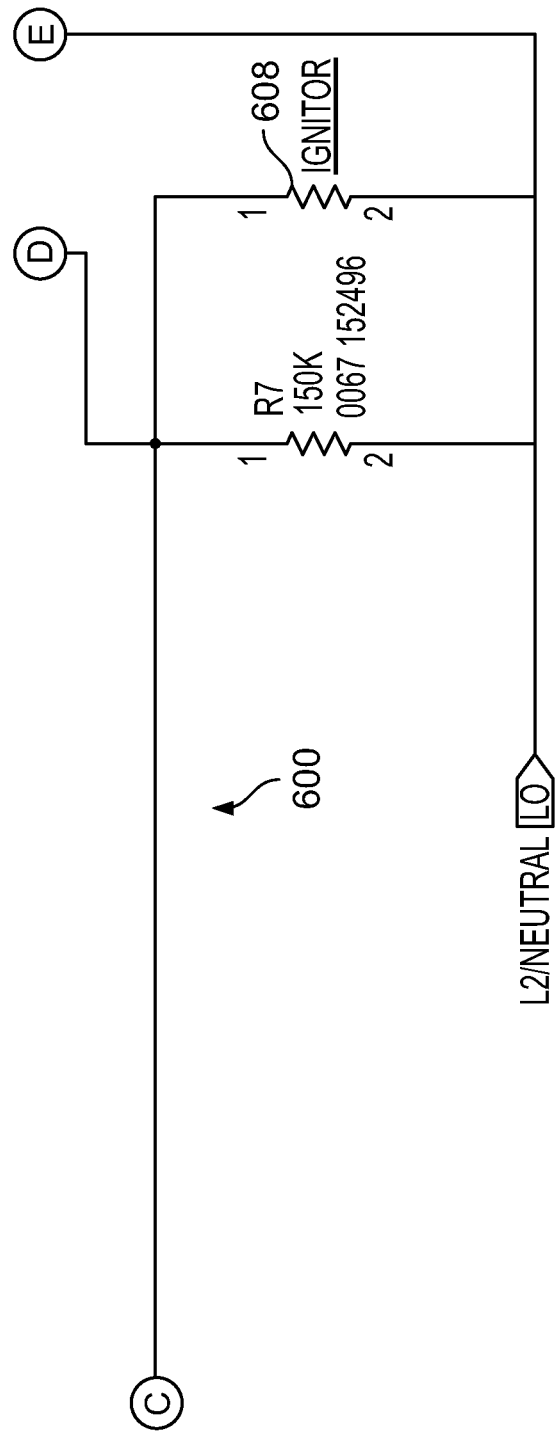

In another example embodiment, a climate control system controller may be provided, e.g., as an integrated furnace control, as indicated generally in FIG. 6 by reference number 600. The example controller 600 includes an igniter relay 604 configured to actuate an igniter 608 for igniting a furnace gas valve (not shown). The igniter relay 604 is a solid-state switching relay that includes an opto-coupler U5 with opto-triac driver, and a switching triac Q27. In operation, a microprocessor (not shown in FIG. 6) signals an NPN transistor Q68 to enable the opto-coupler U5 and opto-triac driver, which drives the triac Q27 to switch on the igniter 608. When the igniter 608 is switched on and operating normally, current flows through the triac Q27 and across the igniter 608.

The controller 600 also includes an inducer relay 650 configured to actuate an inducer 654. The inducer relay 650 is a solid-state switching relay that includes an opto-coupler U4 with opto-triac driver, and a switching triac Q26. In operation, the microprocessor signals an NPN transistor Q67 to enable the opto-coupler U4 and opto-triac driver, which drives the triac Q26 to switch on the inducer 654. When the inducer 654 is switched on and operating normally, current flows through the triac Q26 and across the inducer 654. Additionally, in the present example embodiment, a relay K1 is provided to control operational voltage to triacs Q26 and Q27. If failure of a triac is detected, the relay K1 can be opened to disconnect line voltage to the triacs.

The coincidence or occurrence of a particular current level through the igniter 608 with a particular voltage sensed across terminals MT1 and MT2 of the inducer relay 650 in a particular phase of the ignition sequence can indicate the presence, e.g., of a specific fault in the igniter 608, igniter relay 604, or inducer relay 650. Coincident values indicative of specific component conditions are indicated in bold type in Table 2.

TABLE 2

| Voltage sense<br>Current sense | Phase 0<br>Inducer relay off<br>Igniter off | Phase 1<br>Inducer relay on<br>Igniter off | Phase 2<br>Inducer relay on<br>Igniter on |
|---|---|---|---|
| Good Igniter | Voltage = 0 VAC<br>Current = 0 Amps | Voltage = 60 VAC<br>Current = 0 Amps | Voltage = 120 VAC<br>Current = 10 Amps |
| Open Igniter | Voltage = 0 VAC<br>Current = 0 Amps | Voltage = 120 VAC<br>Current = 0 Amps | Voltage = 120 VAC<br>Current = 0 Amps |
| Open Igniter Relay | Voltage = 0 VAC<br>Current = 0 Amps | Voltage = 60 VAC<br>Current = 0 Amps | Voltage = 60 VAC<br>Current = 0 Amps |
| Shorted Igniter Relay | Voltage = 0 VAC<br>Current = 0 Amps | Voltage = 120 VAC<br>Current = 10 Amps | Voltage = 120 VAC<br>Current = 10 Amps |
| Shorted Inducer Relay | Voltage = 60 VAC<br>Current = 0 Amps | Voltage = 60 VAC<br>Current = 0 Amps | Voltage = 120 VAC<br>Current = 10 Amps |
| Open Inducer Relay | Voltage = 0 VAC<br>Current = 0 Amps | Voltage = 0 VAC<br>Current = 0 Amps | Voltage = 0 VAC<br>Current = 0 Amps |

It should be noted generally that other or additional types of furnace systems, and other or additional furnace system components, could be configured in accordance with various aspects of the disclosure. Current through and voltage across other or additional system components could be sensed, including but not limited to blowers, inducers, other or additional relays, etc., where the sensed current and voltage coincide so as to indicate the presence of a specific condition. Other or additional types of systems in relation to which aspects of the disclosure may be practiced include but are not limited to pressure-assist modulation (PAM) furnace systems, cooling systems, and/or heat pump systems.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges. In addition, disclosure of ranges includes disclosure of all distinct values and further divided ranges within the entire range.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method performed by a controller of a climate control system having an igniter and an igniter relay, the method comprising:
in one or more of a plurality of heating operational phases of the system, sensing current draw by the igniter and sensing voltage between terminals of a second relay of the system, the current draw by the igniter being sensed by the controller independently of the igniter relay;
for a given one of the heating operational phases in which the sensing is performed, comparing the sensed current and voltage with a current value and voltage value predetermined together for the igniter and second relay in relation to the given operational phase to indicate the presence of a condition specifically of the igniter, of the second relay, or of the igniter relay, the comparing performed using a processor; and
based on the comparing, distinguishing between a failure of one of the relays and a failure of the igniter.

2. The method of claim 1, wherein the specific condition includes a failure of or a normal operating condition of the igniter, second relay, or igniter relay.

3. The method of claim 1, wherein the operational phases of the system include phases of an ignition sequence.

4. The method of claim 1, wherein the second relay is a humidifier relay or an inducer relay.

5. The method of claim 4, further comprising detecting an open igniter relay, a shorted igniter relay, or an igniter in normal operating condition in a phase in which the igniter and the second relay are switched on.

6. The method of claim 4, comprising identifying one of a plurality of conditions including the second relay is shorted; the igniter relay is shorted; the second relay is open; the igniter relay is open; the igniter is open; and the igniter is in normal operating condition.

7. The method of claim 4, comprising detecting the second relay as shorted, the detecting performed in a heating operational phase in which the second relay and the igniter are not switched on.

8. The method of claim 4, comprising detecting the igniter relay as shorted or the second relay as open, the detecting performed in a heating operational phase in which the second relay is switched on and the igniter is not switched on.

9. The method of claim 1, performed by a furnace system controller.

10. The method of claim 1, wherein the igniter relay and/or second relay include one or more solid-state switches.

11. A furnace system comprising:
an igniter; and
a controller including an igniter relay, and a current sensing circuit configured to sense, independently of the igniter relay, a current level through the igniter, the controller configured to sense voltage between terminals of a second relay of the controller;
the controller further configured to:
in a given one of a plurality of operational phases of the system, compare the sensed current level through the igniter and the sensed voltage between the terminals of the second relay to a current level and voltage associated together with a specific condition of the igniter, igniter relay, or second relay in the given phase, the comparing performable using a processor of the controller; and
based on a result of the comparing, distinguish between a failure of one of the relays and a failure of the igniter.

12. The furnace system of claim 11, further comprising a humidifier and/or an inducer; and wherein the second relay includes a humidifier relay or an inducer relay.

13. The furnace system of claim 12, wherein the specific condition is identified as one of the following: the second relay is identified as shorted; the igniter relay is identified as shorted; the second relay is identified as open; the igniter relay is identified as open; the igniter is identified as open; and the igniter is identified as in normal operating condition.

14. The furnace system of claim 12, wherein:
the controller is configured to detect the second relay as shorted in a phase in which the second relay and igniter are not switched on.

15. The furnace system of claim 12, wherein the controller is configured to detect a shorted igniter relay or an open second relay in a phase in which the second relay is switched on and the igniter is not switched on.

16. The furnace system of claim 12, wherein the controller is configured to detect an open igniter relay, a shorted igniter relay, or an igniter in normal operating condition in a phase in which the second relay and the igniter are switched on.

17. The furnace system of claim 11, wherein the igniter relay and/or second relay comprise one or more solid-state switching relays.

18. The furnace system of claim 11, wherein the operational phases of the system include phases of an ignition sequence.

19. A controller for an HVAC or furnace system having a gas igniter and an inducer, the controller comprising:
an igniter relay for controlling the igniter, and a current sensing circuit configured to sense, independently of the igniter relay, a current level through the igniter;
the controller configured to:
sense voltage between terminals of an inducer relay for controlling the inducer;
based on the sensing performed after a call for heat and prior to a pre-purge of the system, determine whether the inducer relay is shorted;
based on the sensing performed after pre-purge begins and before igniter warm-up, determine whether the inducer relay is open and determine whether the igniter relay is shorted; and
based on the sensing performed when the igniter is warming up and before a gas valve of the system is energized, determine whether the igniter is operating normally, determine whether the igniter is open, and determine whether the igniter relay is open.

20. The controller of claim 19, further configured to distinguish between a failure of a relay and a failure of the igniter.

* * * * *